UNITED STATES PATENT OFFICE.

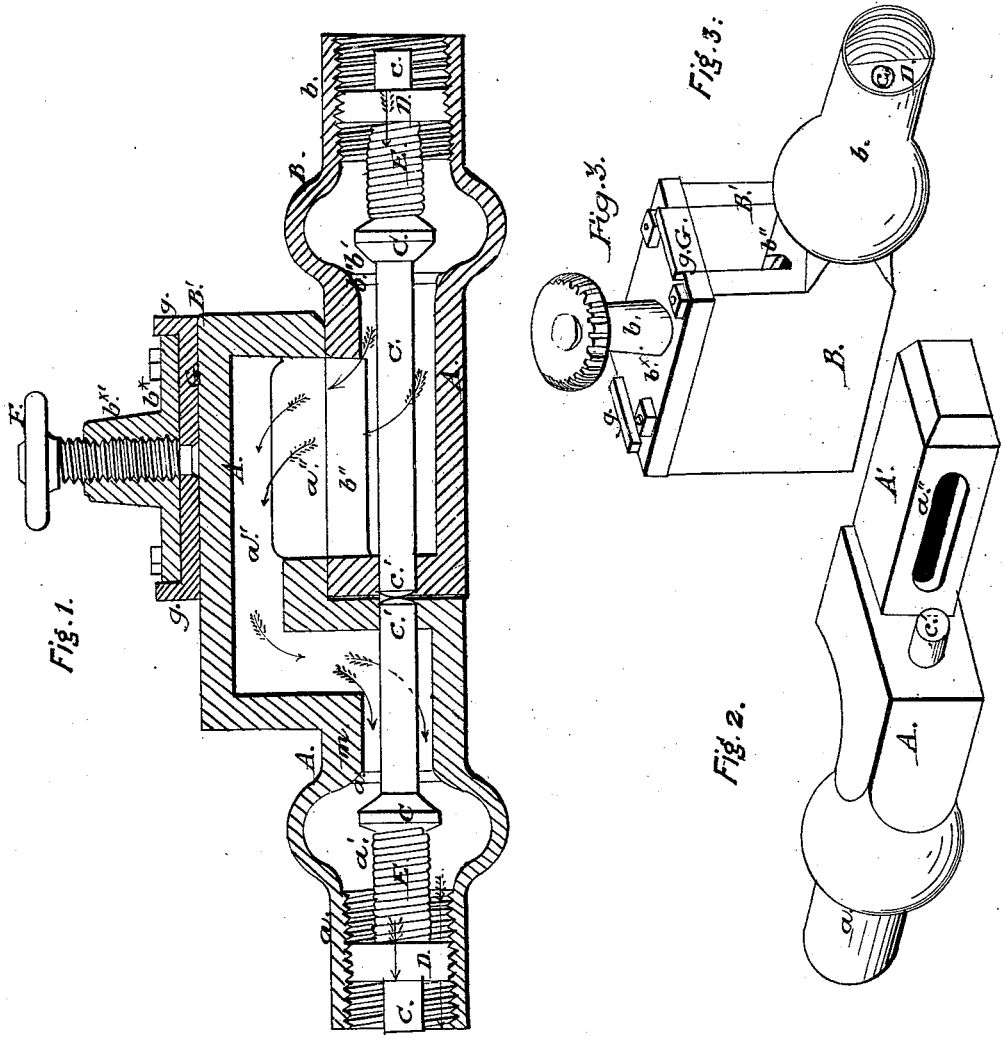

THOMAS SMITH, OF BALTIMORE, MARYLAND.

IMPROVEMENT IN PIPE-COUPLINGS.

Specification forming part of Letters Patent No. 95,528, dated October 5, 1869.

*To all whom it may concern:*

Be it known that I, THOMAS SMITH, of Baltimore, in the State of Maryland, have invented certain new and useful Improvements in Pipe-Couplings; and I do hereby declare the following to be a full, clear, and exact description of the same, reference being had to the accompanying drawings, which are made a part of this specification.

My improvements consist in a novel and superior construction of coupling proper, adapted to be most readily and expeditiously operated and not liable to get out of order, and the provision in the coupling of suitable valves, held in an open position when the coupling is formed and automatically closing when the coupling is separated, to prevent the escape of the hot air, water, or other fluid contained in the respective sections of pipe or hose the coupling is employed to connect.

In the drawings, Figure 1 represents a longitudinal section of a coupling embodying my improvements. Figs. 2 and 3 are perspective views of the two parts or members of the same detached.

A and B may represent, respectively, the two members of the coupling, said members being provided with suitable stems, $a\ b$, for the reception of the pipe or hose, and with chambers or passages $a'\ b'$, terminating in ports $a''\ b''$, adapted to register and form a continuous passage when the members are coupled, as represented in Fig. 1.

In line with the stems $a\ b$ and in line with each other, as represented, or in other convenient position, the members A and B are further provided with valve-seats $a'''\ b'''$ for the reception of valves C C, the stems $c$ of which are supported at their rear ends in suitable bearings, D, adapted to leave the requisite amount of space for the passage of the fluid, and at their front ends, $c'$, in perforations in the front walls of the members proper, as represented, said openings being provided with stuffing-boxes or otherwise packed in any suitable manner. The bearings D may be screwed into the internally-threaded ends of the stems $a\ b$, and form also abutments for springs E, which surround the stems $c$ of the valves, and serve, when the valves are not held from it, to throw and hold the valves against their seats. The extent of the rearward movement of the valves is limited by the abutment of the coils of the springs, as shown, or by other suitable stop, and may be regulated by the adjustment of the bearings D in the threaded sockets in which held, or by other means.

For uniting the members A and B, they are respectively constructed with an overlapping arm or extension, A', which may be of any suitable form in cross-section, and a corresponding socket, B'. The cover or top $b^*$ of the socket B' is constructed with an internally-threaded hollow boss, $b^{*\prime}$, for the reception of a screw, F, by turning which the arm A' is firmly clamped down on the upper surface of the member B, thus locking the two members together, the opposing faces of the two members being ground or provided with suitable packing to secure the requisite tightness of joint.

G represents a bearing-plate swiveled to the screw F, or otherwise applied beneath it, employed in some uses of the coupling to distribute the bearing-surface of said screw over a greater area and prevent its embedding in the surface of the arm A'. The upturned ends $g$ of the plate G, working in suitable recesses in the ends of the cover $b^*$ of the socket B', serve to guide said plate in its movements and to support it longitudinally. The cover $b^*$ may be made separate from the body of the member B, as shown, to facilitate the casting of the part, or by coring, said member, as well as the other, may be cast of its complete form.

The operation of the device is as follows: The members A and B being applied to the respective ends of two sections of pipe or hose which it is desired to connect, the arm A' of A is inserted in the socket B' of B, and the two members drawn closely together until their respective ports $a''\ b''$ register, the valves C C being meanwhile opened by the contact of the projecting ends $c'$ of their stems. The clamping-screw F is then turned and the arm A' of A clamped firmly down upon B, when the coupling will be complete, and the hot air or other fluid be permitted to flow through the passages $b'\ b''\ a''\ a'$, as represented by the arrows in Fig. 1. The abutment of the coils of the springs E or other stop prevents the pressure of the fluid on one of the valves C forcing back the one in the other member, and thus closing itself.

When for any reason it becomes necessary to uncouple the pipes, the screw F is loosened so as to allow the withdrawal of the arm A′ from the socket B′, and the members then separated, the valves C automatically closing against their seats $a'''$ $b'''$, and preventing the escape of the fluid therethrough.

Besides the modifications hereinbefore named, many others may obviously be resorted to without departing from my invention. For instance, the valve C and its appurtenances may be employed in but one member of the coupling when it is desired to shut off the escape from the supply only, or for other purposes, and in some uses of the coupling may be entirely omitted. The projecting stems of the valves may be arranged so as not to coincide, and thus the necessity for any stop be obviated. The ports $a''$ $b''$ may be arranged around the opening for the valve-stem or otherwise in the front ends of the members, and the usual right and left hand screw-nut then employed to unite the two members. The bearings D for the support of the rear ends of the valve-rods may preferably consist of perforated disks instead of bars, as shown.

My improved coupling is intended, primarily, for connecting the pipes of "hot-air heating apparatuses for railroad-cars," where it is often necessary to uncouple the pipes to allow the separation of the cars, and without some such provision as the second part of my invention contemplates great loss of heat would inevitably occur. It is also applicable, however, to connecting steam, gas, or water pipes, fire-engine hose, &c., wherever waste of the fluid the pipes or hose are employed to convey is wished to be avoided, or a safe, tight, and easily and rapidly operated coupling is desired. It is especially applicable to fire-engine hose, being devoid of external screw-thread to be injured by drawing it over the stones, and on account of the rapidity and ease with which it may be operated. As employed in hose especially, the bearing-plate of the clamping-screw may preferably be omitted, and the screw be allowed to embed itself in the surface of the engaging member or in a depression provided in said surface to render the coupling more secure against longitudinal separation. In this use also, as in others, the valves may preferably be omitted and the coupling employed without any such provision. As employed for connecting the pipes of railway-car-heating apparatus, the employment of the bearing-plate of the screw is important as adapting the coupling to be separated by longitudinal strain, which it is only subjected to on the accidental separation of the cars, or in the case of the cars being thrown out of their proper relative position by one of them jumping the track, in which case by this provision the coupling is adapted to separate, as before stated, and strain on the joints or supports of the pipes is thus prevented.

When the coupling is employed in pipes or hose for water, low-pressure steam, or other cold or moist fluid, the opposing faces or seats of the members or parts may be preferably either or both provided with rubber gaskets, instead of ground to form a tight joint.

Having thus described my invention, the following is what I claim as new and desire to secure by Letters Patent:

1. The valves C, seated by means of the springs F, and provided with the projecting stems $c'$, in combination with the pipe-coupling A B, substantially as and for the purpose set forth.

2. The combination of the sections or members A B, constructed, respectively, with the hollow tenon or arm A′ and socket B′, and the clamping-screw F, substantially as and for the purpose described.

3. The adjustable bars D, in combination with the valves C $c$ $c'$ and springs E, as and for the purpose specified.

4. The combination, in the coupling A B, of the stems $a$ $b$, passages $a'$ $a''$ $b''$ $b'$, valve-seats $a'''$ $b'''$, bearings D D, valves C $c$ $c'$ C $c$ $c'$, springs E E, the tenon or arm A′, socket B′, clamping-screw F, and plate G, all constructed, arranged, and operating as represented and described, for the purposes set forth.

THOMAS SMITH.

Witnesses:
WM. H. BRERETON, Jr.,
F. JOSEPH EPP.